United States Patent [19]

Karamon

[11] 4,095,882
[45] Jun. 20, 1978

[54] PROJECTED IMAGE DISPLAY SYSTEM

[76] Inventor: John J. Karamon, 118 East Ave., Stamford, Conn. 06840

[21] Appl. No.: 672,831

[22] Filed: Apr. 1, 1976

[51] Int. Cl.² .................. A63J 3/00; G03B 21/56; G03B 21/00

[52] U.S. Cl. .................. 353/122; 272/8 P; 272/10; 350/120; 353/1

[58] Field of Search .................. 353/1, 121, 122, 28; 350/120; 84/464; 272/8 P, 10, 13

[56] References Cited

U.S. PATENT DOCUMENTS

| | | | |
|---|---|---|---|
| 1,864,946 | 6/1932 | Schrago | 350/120 |
| 3,048,075 | 8/1962 | Wright | 353/121 |
| 3,198,066 | 8/1965 | McGhee | 350/120 |
| 3,235,722 | 2/1966 | Burnbaum | 353/1 |
| 3,334,816 | 8/1967 | Mizuno | 353/122 |
| 3,473,428 | 10/1969 | Phillips | 84/464 |
| 3,603,195 | 9/1971 | Williams | 84/464 |
| 3,609,339 | 9/1971 | Smith | 353/1 |

*Primary Examiner*—Steven L. Stephan

[57] ABSTRACT

A display system, of the type used by exhibitors to attract attention or to create a desired background, is characterized by new and striking visual effects. The system receives projected images upon a mobile formed of a plurality of suspended panels free to move relative to one another in air currents. The panels, when aligned, form a surface, e.g., a rectangle having a format matching the image. Images are projected onto the moving panels of the mobile with a slide projector, film projector, or other image projection means. The projected image is separated into components by the moving panels and periodically the components coalesce partly or wholly when adjacent panels move into alignment. Changes in focus and distortions of linearity occur as panels rotate in relation to the projector's field of image. Striking and dramatic visual effects result. A still photograph may be converted into a moving, dynamic image, with devices that are durable and require little attention in use.

5 Claims, 6 Drawing Figures

PROJECTED IMAGE DISPLAY SYSTEM

BACKGROUND OF THE INVENTION

1. Field of the Invention

This invention relates to visual displays of the type used by exhibitors and advertisers in connection with exhibited products to attract attention or to create a suitable background effect. More specifically, the invention relates to display systems for photographic or other projected visual images.

2. Description of the Prior Art

Projected image displays heretofore typically have comprised screens upon which a still or moving image is projected, either from the front or back of the screen. Such devices are relatively simple and easy to use, but have largely lost their ability to attract attention, and rely almost wholly on the content of the image to achieve visual impact and effect.

Certain other arrangements, such as disclosed in U.S. Pat. No. 3,480,346, have created new visual effects by projecting images upon a screen comprised of several side by side sections which are controllably pivoted to different fixed angles from the plane of the screen to create controlled linearity distortions and changes of shape in the image. Such devices have not been fully satisfactory, however, because of the complexity of control arrangements, because of the need to position the observer in selected locations, and because of the need to provide motion pictures, usually with multiple projectors, in order to supply visual dynamics.

SUMMARY OF THE INVENTION

The principal object of the present invention is to provide an improved display system characterized by novel visual effects. Further objects of the invention are to provide such a system for displaying visual images which provides a striking and dramatic visual effect, which is simple and requires little attention in use, and which is able to supply a moving image effect from still images. Still another object of the invention is to provide a projected image display which is more suitable for commercial use in exhibitions, fairs, advertising displays, and the like.

In a particular embodiment of the invention to be described hereinbelow in detail, the display system for developing novel visual effects comprises a mobile formed of a plurality of suspended panels free to move continuously relative to one another in air currents. Preferably the panels are arranged to form a complete surface, for example in the shape of a rectangle, when aligned. A means, such as a slide or motion picture projector, is provided to project a visual image upon the moving panels of the mobile. In a striking and dramatic manner, the image is separated into components by the moving panels, with accompanying shifts in focus and angle, and the image then periodically is reformed into larger components of the entirety of its normal appearance when adjacent panels move into alignment to form a continuous surface. This arrangement has several advantages in displaying an image. The position of the observer is relatively unimportant, the mobile remains in motion with slight air currents existing normally or augmented with a small fan, and the device functions durably and without attention from an operator. Even more significantly, the device generates distinctive visual effects which gather attention or serve to establish a selected mood, and can achieve dynamic effects by the projection of still images.

In further aspects of the invention, the moving panels of the mobile are arranged in a format to match the format of the projected image, and the panels are formed either with a projection screen surface for display of the images directly upon the panels, or with a mirror surface for displaying reflected images on adjacent walls or the like. The projecting means focuses either a still or moving image either on the panels, or on a wall adjacent the panels after reflection therefrom.

Other objects, aspects and advantages of the invention will be pointed out in, or apparent from, the detailed description hereinbelow considered together with the following drawings.

DESCRIPTION OF THE PREFERRED EMBODIMENTS

Figure 1:
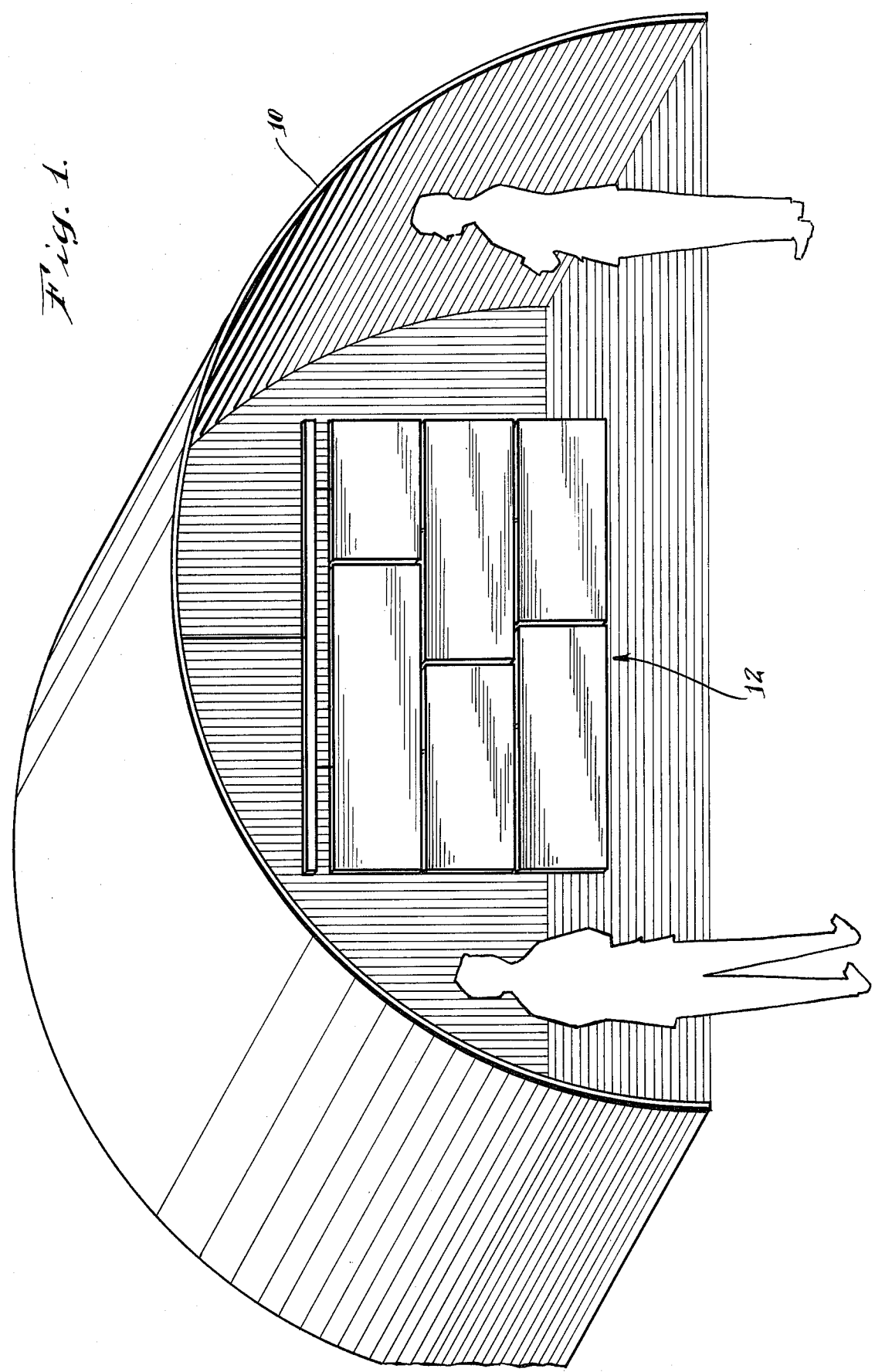
FIG. 1 illusrates an image display system constructed in accordance with the present invention in use in an exhibition context.

Referring to the drawings, FIGS. 1 illustrates an exhibit area 10, at a trade show or fair, for example, incorporating an image display system 12 constructed in accordance with the present invention and displaying a visual image. As will be explained in greater detail below, the image display system 12 creates sfriking and dramatic visual effects capable of attracting viewers to the exhibit space 10, or capable of setting a tone and mood thought suitable for display and sale of commercial products.

Figure 2:
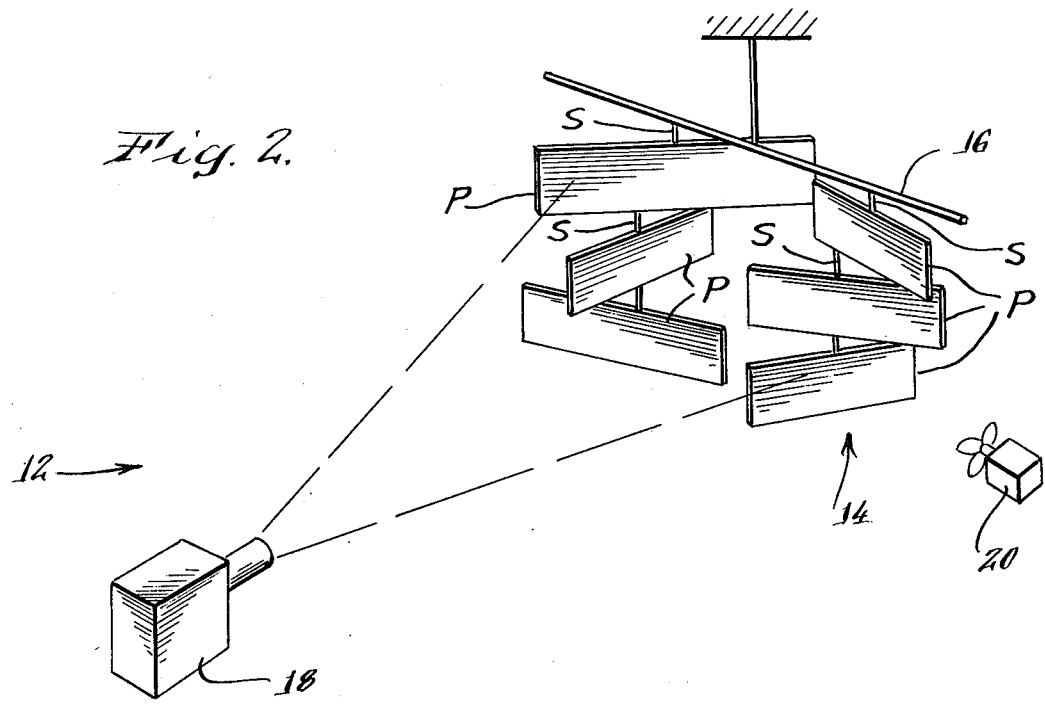
FIG. 2 is a schematic perspective view of an image display system in accordance with the present invention.

As shown in FIG. 2, the image display system 12 comprises a mobile 14 comprising a beam 16 rotatably suspended from above, a plurality of panels P suspended from the beam and one another by wires or lines s and free to move continuously relative to one another in air currents in typical mobile fashion. Alternatively, the panels may be suspended from below, e.g., on journalled shafts. The panels P are sized, counterweighted, and arranged relative to the suspension lines s so as to balance the panels and to permit them to rotate about a vertical axis. The panels, moreover, are arranged relative to suspension lines s to permit the panels to rotate through a full circle without colliding with horizontally adjacent panels.

The particular mobile shown in FIG. 2 has rectangular panels of random width and uniform height, arranged in three horizontal rows of two panels each with the left hand column of three panels interleaving with the right hand column of panels. As the panels rotate about their suspension lines s, a random motion effect results. The mobile is arranged so that the panels P, when aligned with one another, form a complete surface, capable of displaying essentially the complete image projected thereon by means of a projector 18. The particular mobile illustrated in FIG. 2 forms a rectangle when its panels are aligned which has the same dimensional ratio or format as a 35 millimeter slide, and is arranged to receive a projected image from a 35 millimeter slide which just fills the rectangular area. In a similar fashion, the mobile may be designed to form a shape which matches the format of other standard film sizes. In addition, while the mobile 14 shown in FIG. 2 has panels P forming a flat planar surface, it is contemplated that curved surfaces may also be formed, and that the panels P may have depth and be capable of displaying an image on side surfaces as well as front and back surfaces. In addition, while the panels P are shown as being themselves of rectangular shape, other shapes may be utilized provided that the panels together form approximately a continuous surface.

As air currents strike the mobile 14, the panels P move relatively to one another, with a random motion pattern in the embodiment shown in FIG. 2. If desired, the entire mobile 14, suspended from beam 16, may be allowed to rotate. As the panels rotate, the image projected thereon is separated into components by the moving panels, and the components periodically are reformed into a larger portion of the image when adjacent panels move into alignment to form a continuous surface. Accordingly, a perceptually interesting visual effect is obtained as portions of the image are put together, like pieces of a puzzle, in different areas of the mobile, and, less frequently, as all the panels fall in substantial alignment and reveal the complete image. In addition, as the panels move and become positioned at an angle to the projection plane, distortions in both linearity and focus develop and then disappear when the panels rotate back into the projection plane. When these effects are superimposed a striking and dramatic appearance results, in which a single image forms a montage continuously in flux.

If in some environments insufficient ambient air currents exist, or if more rapid motion of the panels is desired, an air current generator, such as a small fan 20, may be supplied to impinge air currents upon the mobile 14. In addition, in certain circumstances it may be desirable to selectively override the random motion of the panels and to control the panels, as with motors (not shown), to bring panels into alignment at a prescribed moment, as when an advertising logo is to be projected upon the mobile.

The projector 18 may be e.g., a slide projector arranged to project still images, or it may be a motion picture projector. Standard commercial projectors are suitable for use in the present image display system. It will be noted that the projection of still images upon the moving panels P of mobile 14 results in a highly dynamic visual effect. Where moving picture images are shown in panels P, the dynamic effect is increased. In the display system 12 shown in FIG. 2, projector 18 is arranged to focus the image directly upon the panels P of the mobile 14, and the panels P are constructed, as will be explained below with reference to FIG. 5, with surfaces of a material which reflects the image directly from the mobile to an observer.

Figure 3:
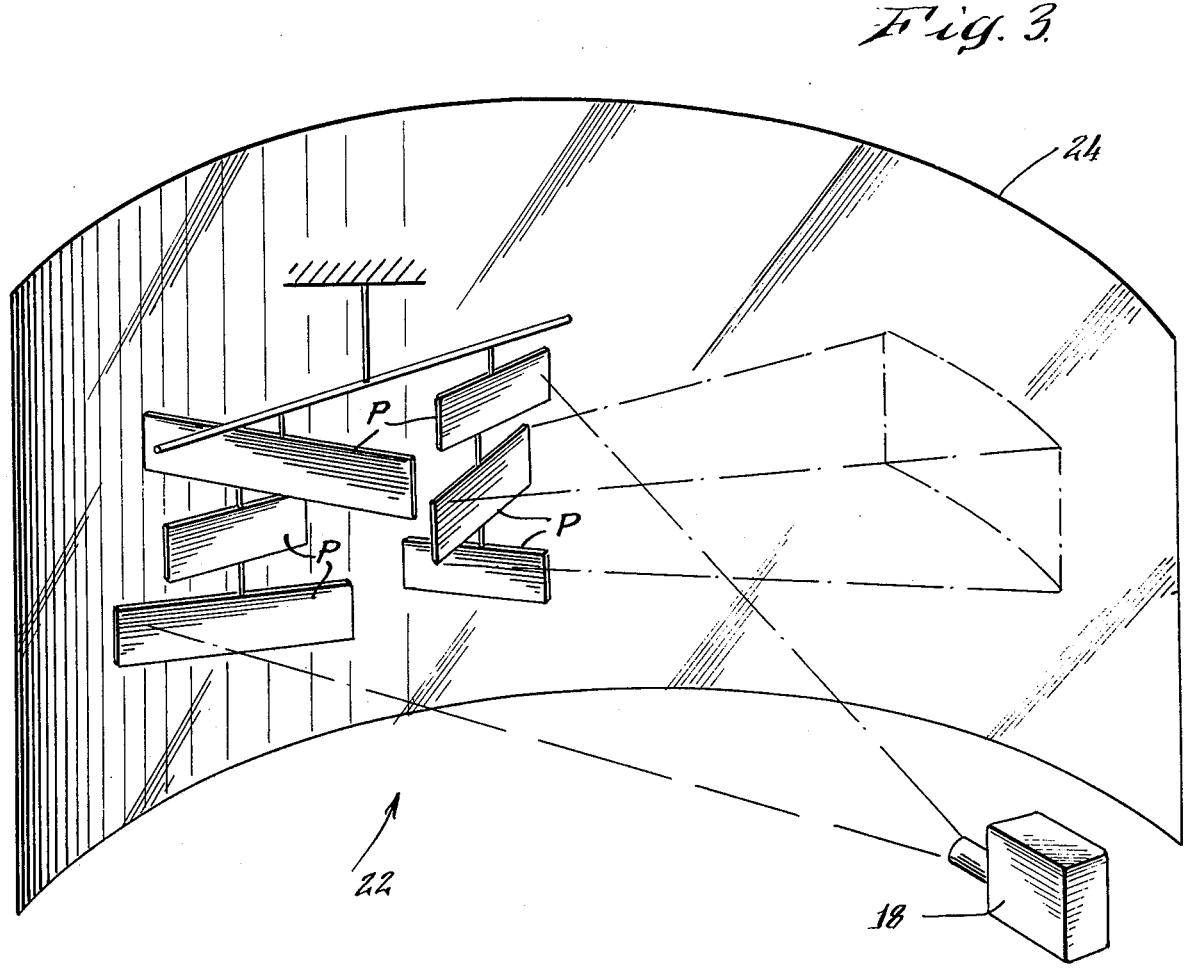
FIG. 3 is a schematic perspective view of another embodiment of the invention.

FIG. 3 illustrates a display system 22 similar to display system 12, except that the panels P have faces of a highly reflective or mirror-like material, such as metalized Mylar, which reflects an image from projector 18 to an adjacent wall or screen 24 forming an imaging surface. The projector 18 focuses the image not upon the mobile, but upon the wall 24 after reflection by the mobile. In this way, additional visual effects are obtained, and may be displayed over a relatively large wall surface using a mobile of moderate size.

Figure 4:
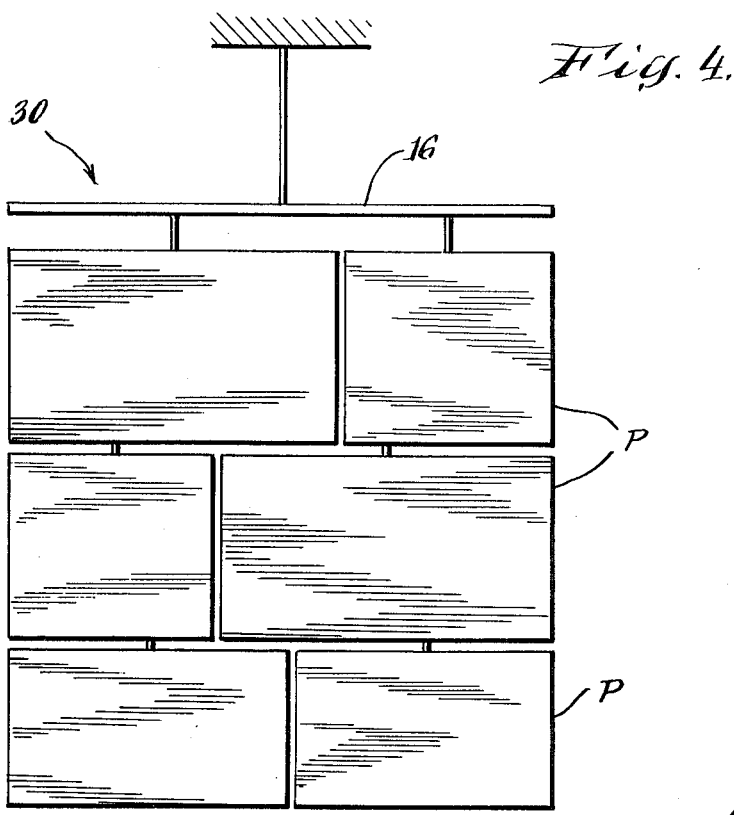
FIG. 4 is an elevational view of a display mobile arranged with a different format.

FIG. 4 illustrates a mobile 30 which is similar to the mobile 14 illustrated in FIG. 2, but which has its panels P arranged in a square format, matching the square format of a frame of film projected thereon. As mentioned previously, other formats may be selected, and the mobile can be positioned to match the image from a single projector, to match images from more than one projector, or to intercept only a desired portion of a projected image.

Figure 5:
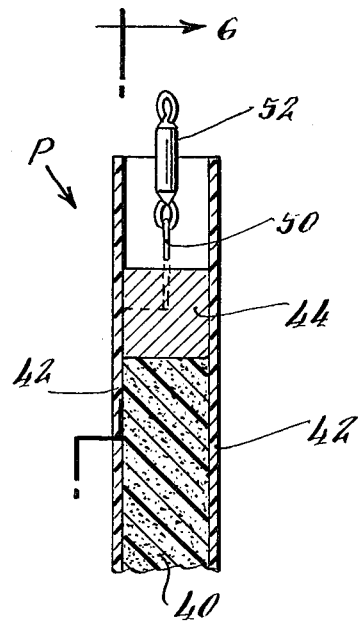
FIG. 5 is a cross-sectional view showing the construction of a panel.
Figure 6:
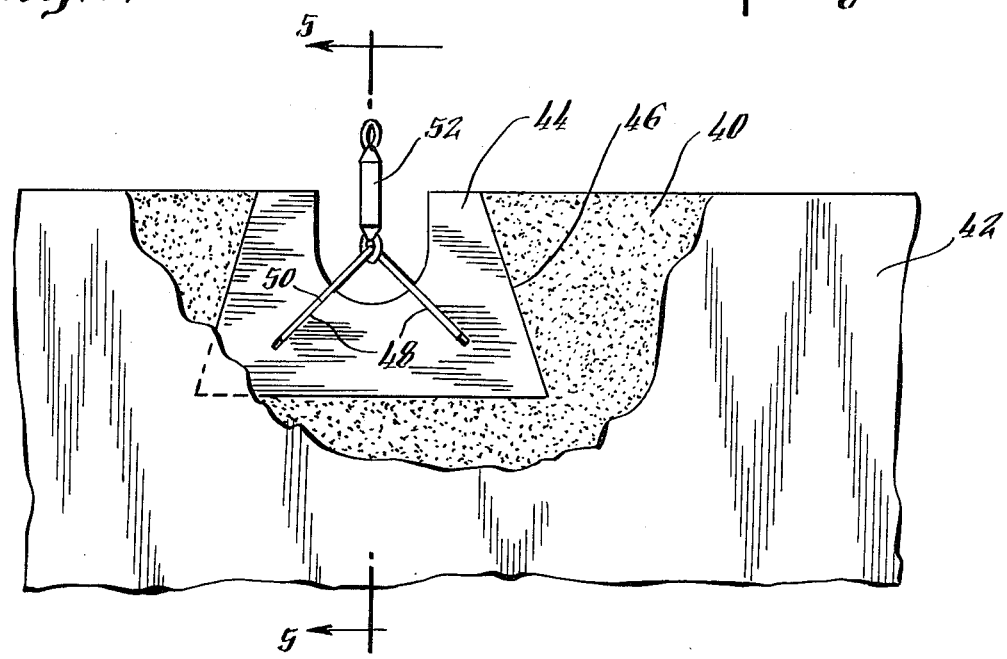
FIG. 6 is a partial elevational view on line 6—6 of FIG. 5 showing details of the panel suspension apparatus.

FIGS. 5 and 6 illustrate the construction of a typical panel P. As illustrated, the panel comprises a central foam core 40, of polyurethane, for example, which can be selectively removed for insertion of counterweights (not shown), sandwiched between adhesively secured sheets 42 of paperboard, such as Bainbridge board, which is painted white for good reflective properties. A support block 44, e.g. of balsa wood, fits into an undercut opening 46 in the foam core 40, and has a v-shaped groove 48 cut therein. A V-shaped wire 50 fits in the groove 48, and holds the lower end of a bearing swivel 52 which in turn connects to suspension line s.

Other panel constructions can be used. For example, a panel (not shown) may comprise internal wooden frame members extending around the rectangular periphery of the panel, covered with sheets of light reflecting projection screen material attached to the outer edges of wooden frame members with fasteners such as staples or tacks. The suspension wire or line s, connected to a swivel, may connect to a screw eye threaded into the frame member. Still another panel construction (not shown) may be used where both front and back viewing of the projected image is desired. Here a peripheral frame carries a single sheet of translucent screen, such as the diffuser screen sold under the name "Rolux" by Roscoe Industries of Port Chester, New York.

As set forth hereinabove, the present invention realizes a display system for a projected image which has a relatively simple construction and requires little attention in use, but which at the same time is capable of novel and useful visual effects which permit, if desired, a still photograph to be used to develop a dynamically changing image with an eye catching effect.

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

I claim:

1. A visual image display system characterized by novel visual effects, cmprising:
    a mobile formed of a plurality of adjacent panels together forming a substantially continuous and complete image-receiving surface when aligned;
    means for suspending each panel for continuous random horizontal rotation relative to the other panels without collision with the other panels in the mobile;
    the mobile having a plurality of panels in the vertical direction, the lower panels in the vertical direction being suspended from the panels thereabove;

means for impinging air currents upon the panels to cause them to rotate horizontally in a continuous apparently random manner relative to one another; and means for projecting a visual photographic image upon the rotating panels of the mobile;

whereby the full projected photographic image is separated by the rotating panels into individually moving components each independently changing in linearity and focus, and then periodically is reformed partially or wholly when adjacent panels move into alignment and form a continuous surface.

2. A display system as claimed in claim 1 wherein the mobile is formed of a plurality of different-sized panels in the horizontal direction.

3. A display system as claimed in claim 1 wherein the panels are rectangular, and are suspended from a support itself free to rotate horizontally.

4. A display system as claimed in claim 1 wherein the projecting means is arranged to focus the image on the mobile, and wherein the mobile panels are formed of material reflecting the projected image to an observer.

5. A display system as claimed in claim 1 further comprising an imaging surface spaced from the mobile, and wherein the mobile has panels formed with a mirror surface and wherein the projecting means is arranged to focus the image on the imaging surface after reflection from the movbile panels.

* * * * *